Sept. 22, 1964         F. MARZILLIER         3,149,373
PRODUCTION OF HOLLOW MOULDED ARTICLES
Filed Jan. 28, 1963                         11 Sheets-Sheet 1

Inventor
Frederick Marzillier
By Lucke & Lucke
Attorney

Sept. 22, 1964 F. MARZILLIER 3,149,373
PRODUCTION OF HOLLOW MOULDED ARTICLES
Filed Jan. 28, 1963 11 Sheets-Sheet 3

Inventor
Frederick Marzillier
By Lucke & Lucke
Attorney

Sept. 22, 1964    F. MARZILLIER    3,149,373
PRODUCTION OF HOLLOW MOULDED ARTICLES
Filed Jan. 28, 1963    11 Sheets-Sheet 5
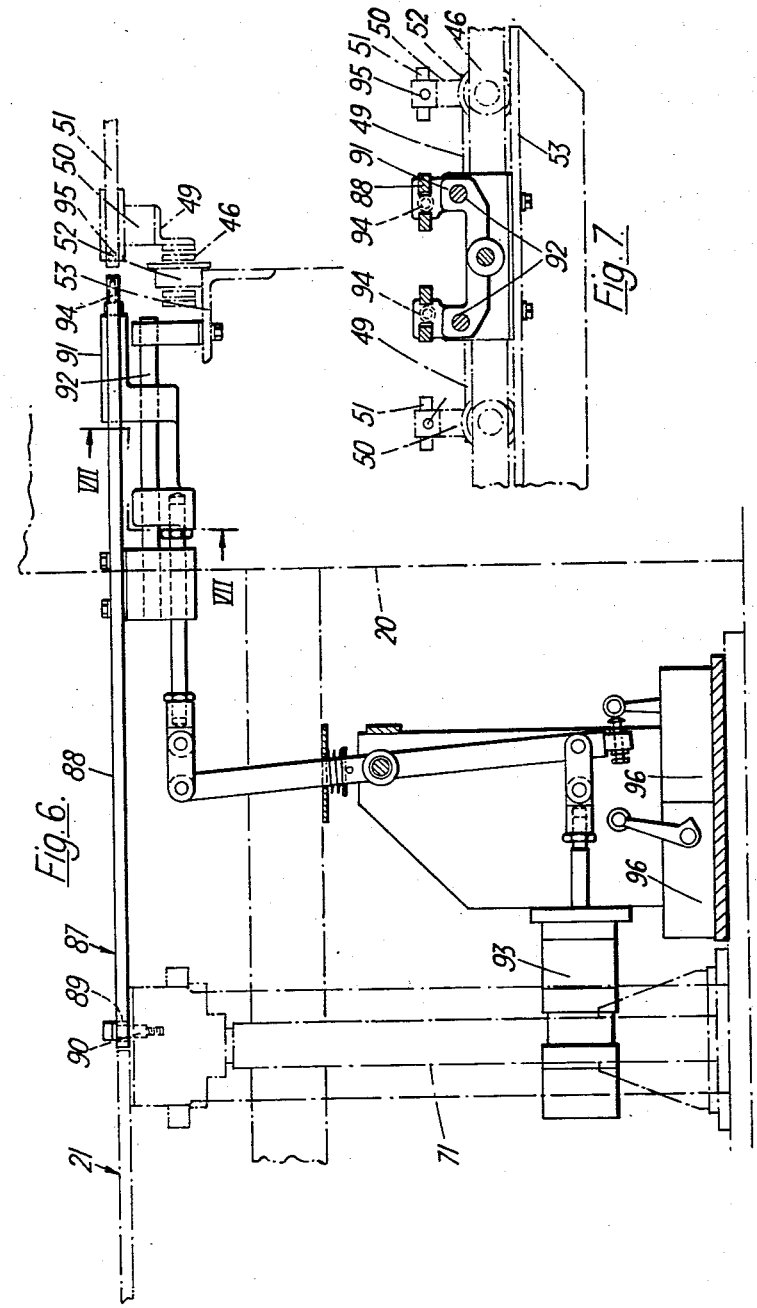

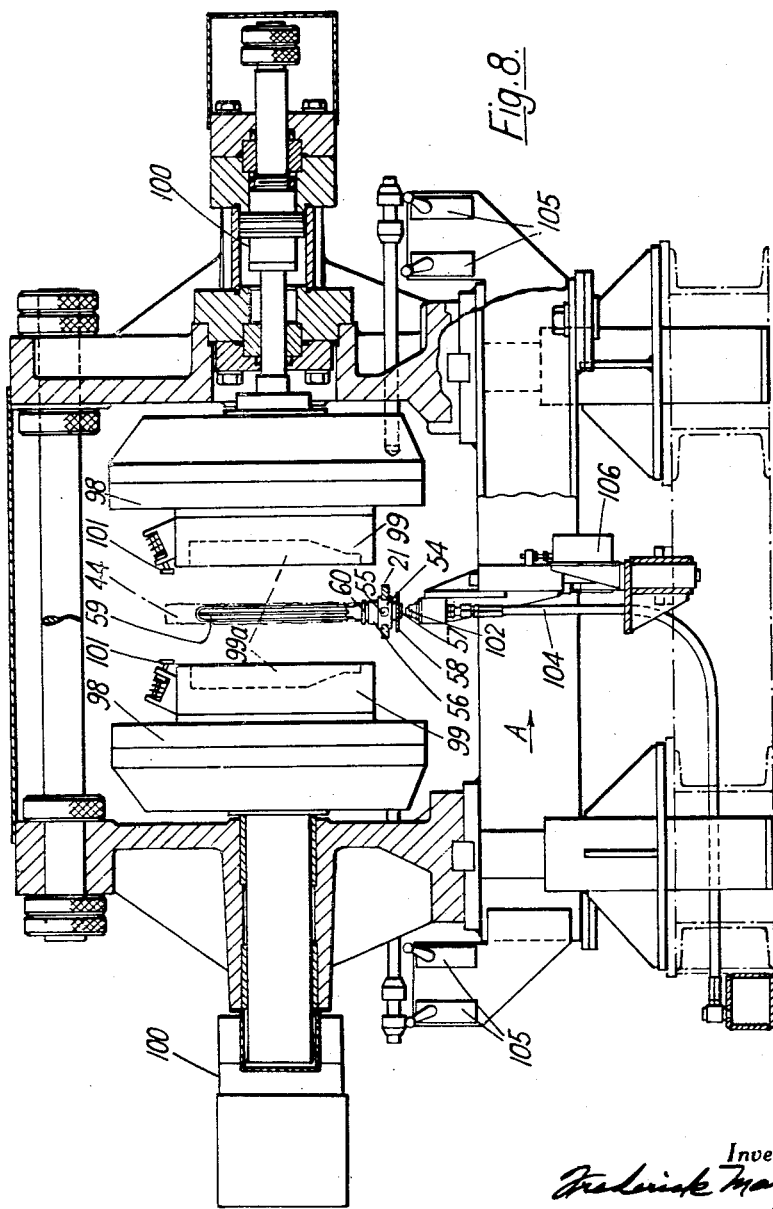

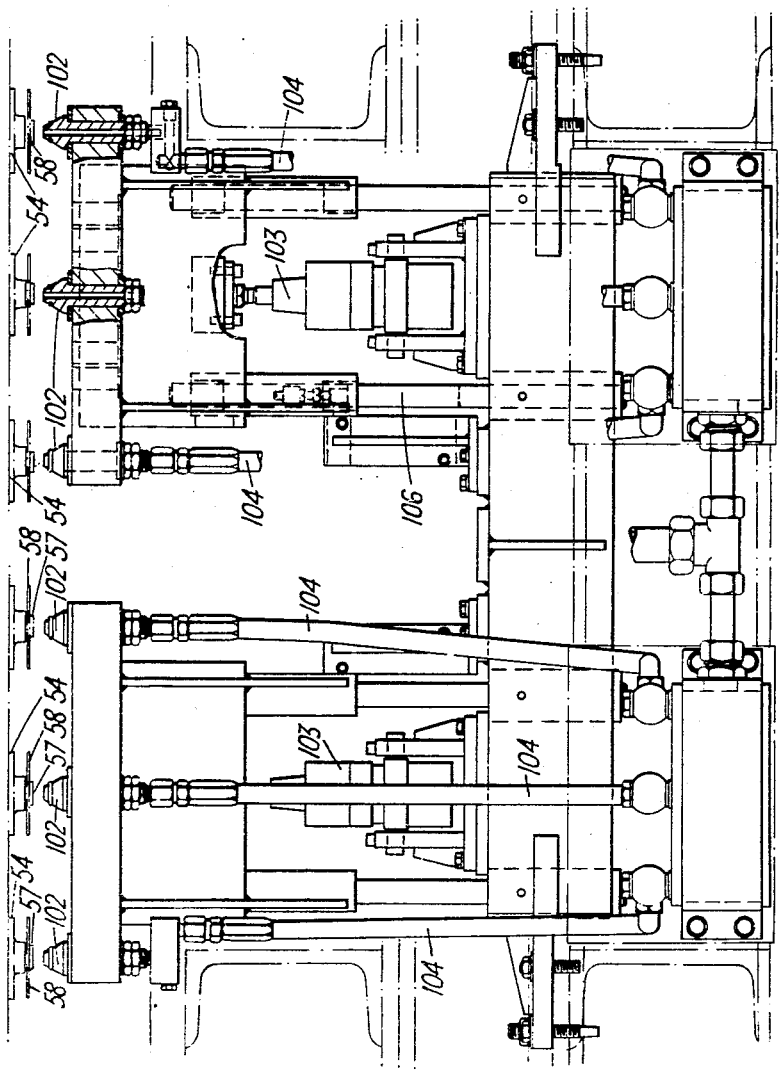

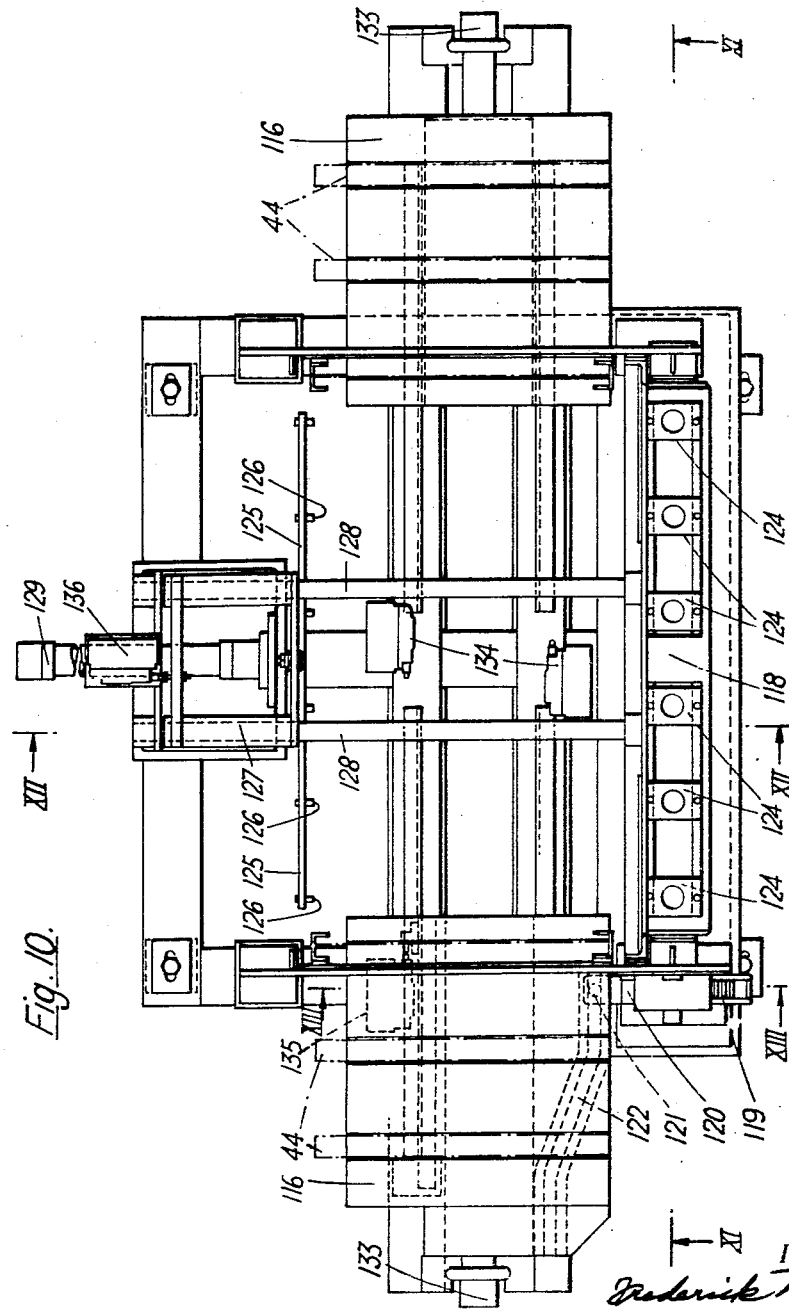

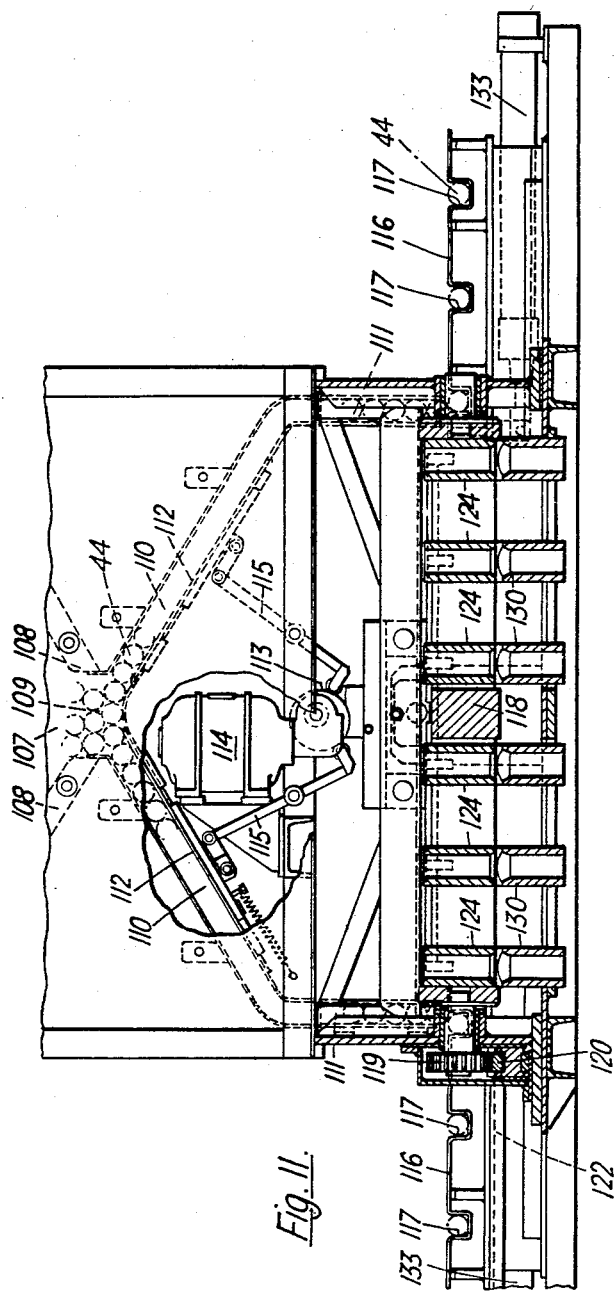

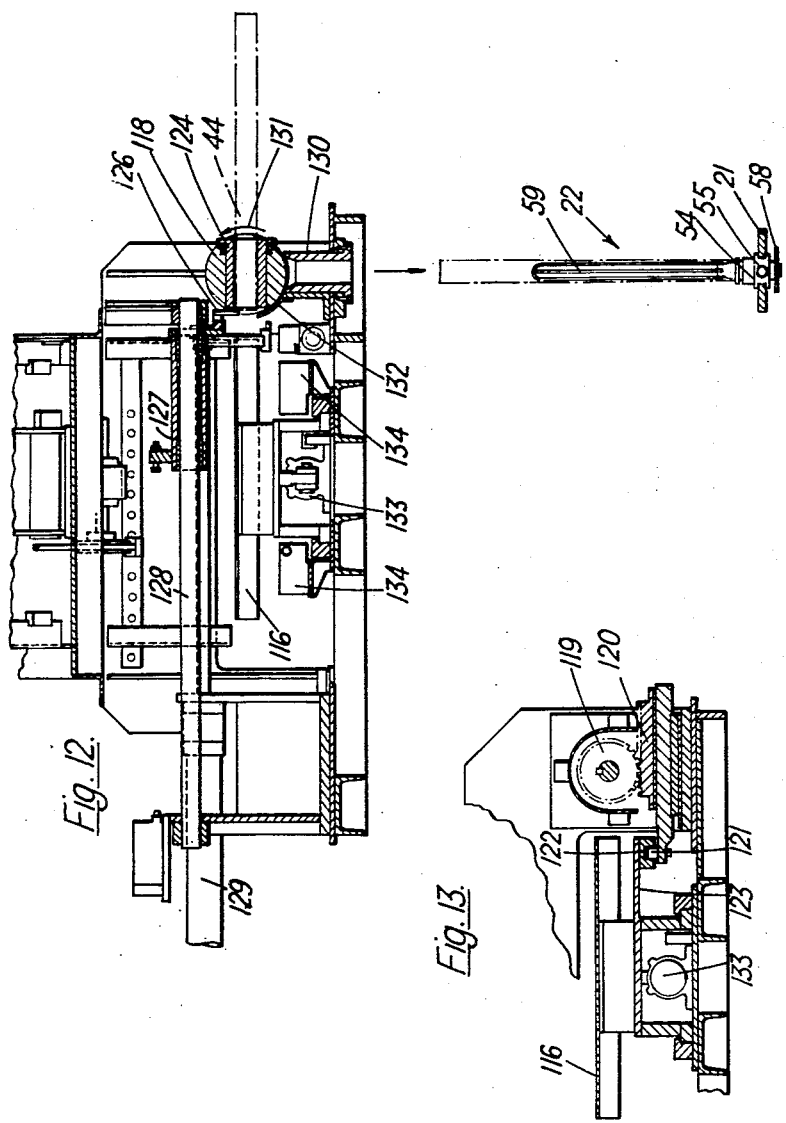

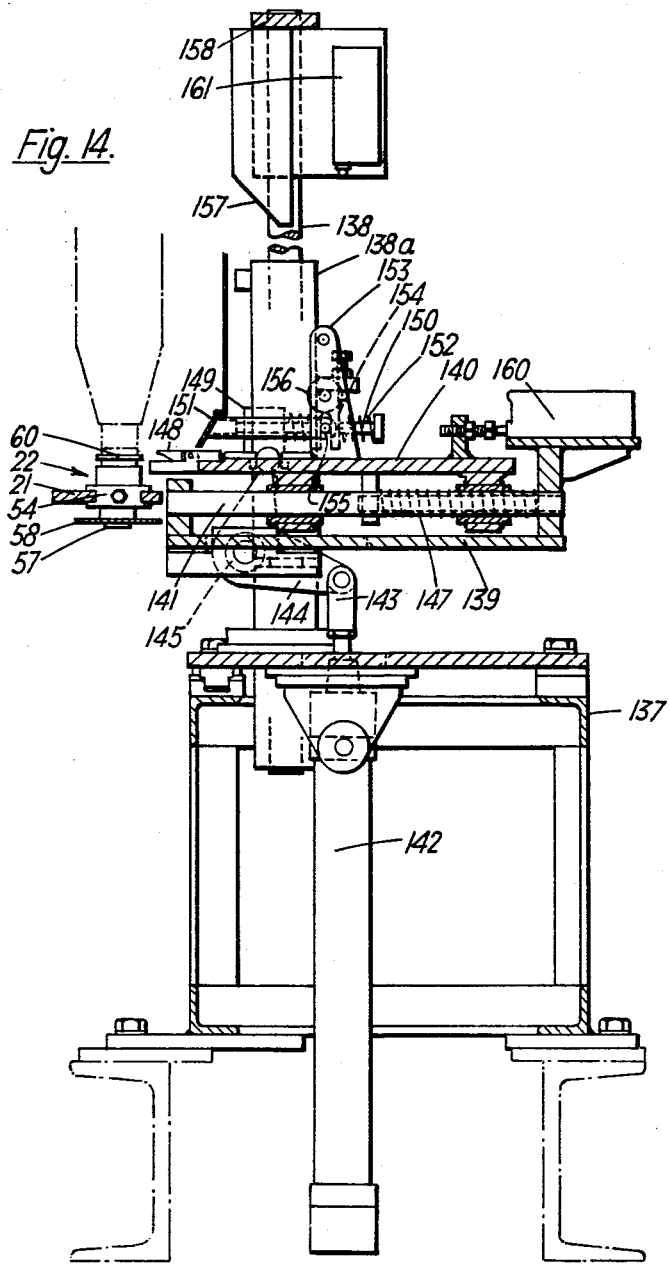

United States Patent Office 3,149,373
Patented Sept. 22, 1964

3,149,373
PRODUCTION OF HOLLOW MOULDED ARTICLES
Frederick Marzillier, Reading, England, assignor to Marrick Manufacturing Co. Limited, Reading, England, a British company
Filed Jan. 28, 1963, Ser. No. 254,109
Claims priority, application Great Britain, Jan. 26, 1962, 3,068/62
8 Claims. (Cl. 18—5)

This invention concerns the production of hollow moulded articles, such as bottles, from thermoplastic materials, in particular from so-called "rigid" PVC.

In my Patent No. 3,079,637, dated March 5, 1963, there is disclosed apparatus comprising, broadly, means for heating a series of discrete lengths of thermoplastic tubing to moulding temperature, means for transferring such tubing lengths successively to a mould, means for introducing fluid under pressure into a tubing length within such mould to expand said tubing length into conformity with the mould configuration, and means for removing the expanded tubing length from such mould following the cooling of the expanded tubing length therein. In such specification there is disclosed, in particular, apparatus characterised by a plurality of moulds arranged in a circle on a turret or table that is intermittently rotated to bring the moulds sequentially into a loading position for the introduction of heated tubing lengths into the mould, rotation of the turret or table eventually carrying such mould to an unloading position for removal of the cooled, expanded tubing length from the mould.

Although such apparatus will operate successfully to produce hollow moulded articles from thermoplastic tubing, the output of such apparatus is limited by the cooling time which must elapse between expansion of a heated tubing length in the mould and the subsequent opening of the mould for removal of the moulded article in a sufficiently rigid condition to retain its moulded shape and withstand subsequent handling. For high outputs, therefore, the turret or table must be equipped with a number of moulds so that, whilst the expanded tubing length in any one mould is cooling, further heated tubing lengths can be introduced into other moulds for expansion therein.

The aparatus that is particularly described in the aforesaid specification has a turret or table equipped with four moulds and, whilst it would be possible to design apparatus of similar form but having a larger number of moulds, it will be understood that, as the number of moulds is increased, the size and weight of the turret or table must correspondingly increase; moreover, as the number of moulds is increased, the period available for each indexing movement of the turret or table decreases (for a constant cooling period). Accordingly, the problem of providing a satisfactory drive for the turret or table is increased by two factors, namely increased inertia and increased acceleration and deceleration requirements as the number of moulds on the turret or table is increased.

There is thus in practice a limit to the output of apparatus constructed generally as disclosed in the aforesaid specification and an object of the present invention is to provide improved apparatus which is inherently capable of development to obtain greater outputs than the apparatus particularly described in the aforesaid specification.

The present invention consists in an apparatus for forming hollow articles from thermoplastic material. Such apparatus comprises a plurality of mandrels for supporting individual discrete lengths of thermoplastic tubing, a loading station including means for loading said mandrels with said tubing lengths, an oven for heating mandrel-supported tubing lengths to moulding temperature, a moulding station including mould means adapted to receive at least one of said mandrel-supported tubing lengths at moulding temperature and means for introducing fluid under pressure into said tubing length to expand same into conformity with said mould means to form a moulded article, an unloading station including means for removing said article from said mandrel, slides supporting said mandrels, a guide track supporting said slides for movement therealong and extending from said oven to and through said moulding station, thence to and through said unloading station and thereafter to and through said loading station to said oven, a drive conveyor extending within said oven, said conveyor including transverse guides for receiving said slides for conveyance through said oven in side-by-side spaced-apart relationship, means for intermittently advancing said drive conveyor, means operative when said drive conveyor is at rest for discharging at least one of said slides from said drive conveyor into said guide track while advancing said slides in the latter to feed a corresponding number of said slides from said guide track into said drive conveyor, and means co-ordinating the operations at said stations with the movement of said slides in said guide track.

The mould means at the moulding station may conveniently comprise several moulds for simultaneous cooperation with a group of heated tubing lengths supported by mandrels on the conveyor means, so that a plurality of moulded articles are formed at each operation of the mould means at the moulding station, it being understood that in such case the intermittent movement of the conveyor means will be such as to advance the conveyor means at each step by an amount corresponding with the length of the conveyor means mounting mandrels supporting the group of tubing lengths to be moulded simultaneously.

The apparatus may include, between the oven and the moulding station, a pretreating station at which the heated tubing lengths are pretreated to condition them for moulding at the moulding station. For instance, the pretreatment station may comprise cooling fluid jets directed at specific regions of the heated tubing lengths so as to cause temperature differences between individual parts of each heated tubing length whereby in the course of moulding the cooler parts of a heated tubing length will tend to "balloon" less and thus give rise to regions of greater thickness in the moulded article.

In order that the invention may be more thoroughly understood, a preferred embodiment thereof will now be described by way of example and with reference to the accompanying drawings in which:

FIGURE 6 is a part-sectional elevational view of a track locator unit of the apparatus;

FIGURE 7 is a section on line VII—VII of FIGURE 6;

FIGURE 8 is a section, on an enlarged scale, on line VIII—VIII of FIGURE 1;

FIGURE 9 is a part-sectional elevational view in the direction of arrow A, FIGURE 8;

FIGURE 10 is a plan view of the loading station of the apparatus, the tube hopper being omitted for clarity;

FIGURE 11 is a section on line XI—XI of FIGURE 10;

FIGURE 12 is a section on line XII—XII of FIGURE 10 but showing the apparatus in a different stage in its operating cycle;

FIGURE 13 is a fragmentary section on line XIII—XIII of FIGURE 10 and

FIGURE 14 is a part-sectional elevational view on line XIV—XIV of FIGURE 1, of the unloading station of the apparatus.

Figure 1:
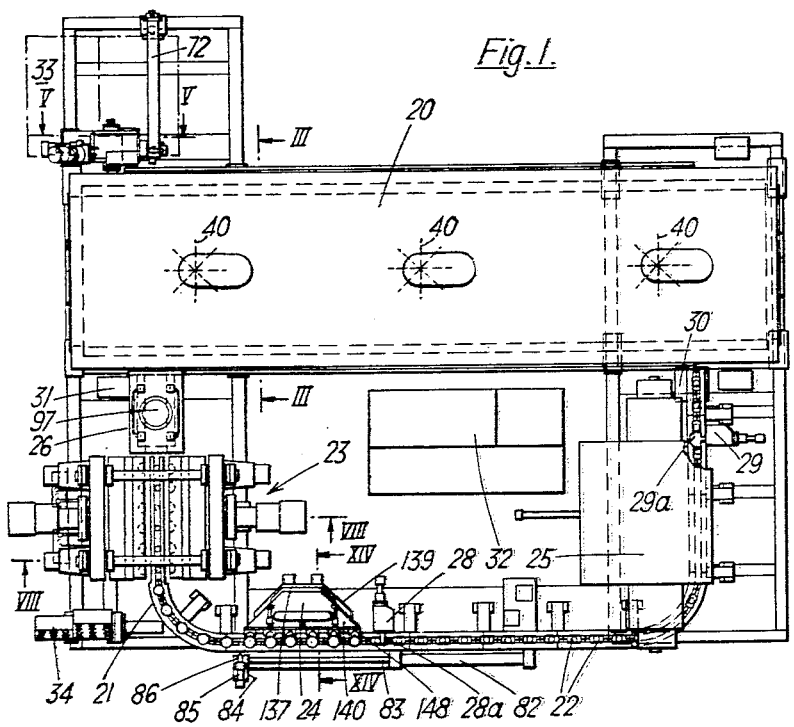
FIGURE 1 is a plan view of apparatus constituting one embodiment of the invention.

In the embodiment of the invention illustrated in the drawings the apparatus comprises an oven generally designated 20 and conveyor means comprising an endless conveyor (hereinafter described) within the oven 20 and a mandrel guide track 21 for conducting groups of mandrels 22 from an exit of the oven to and through a moulding station 23, thence to an unloading station 24, thence to a loading station 25 and back into the oven 20. The apparatus further comprises ancillary devices such as a pre-treatment station 26, driving means 27 for intermittently advancing the oven conveyor therewithin, means for moving groups of mandrels along the mandrel guide track 21 in timed relation to the advance of the oven conveyor, mandrel locater units 28, 29, track locater units 30, 31 and control equipment housed in cabinets 32, 33 and a control panel 34. The various units of the machine will be described in detail hereinafter.

The particular embodiment here illustrated is shown adapted for the simultaneous moulding of six hollow articles, such as bottles, in each operating cycle, but by change of the number of moulds at the moulding station and other corresponding adjustments, the apparatus can be used to produce up to ten articles simultaneously in each operating cycle.

Thus in the machine as illustrated, in each cycle of operation six lengths of thermoplastic tubing are loaded simultaneously on to individual mandrels 22 at the loading station 25, the mandrels 22 loaded with such tubing lengths being then introduced into the oven 20 to be carried by the conveyor therewithin which is advanced one step per cycle to carry the mandrels through the oven to the discharge end thereof. In the oven 20, the tubing lengths on the mandrels are raised to moulding temperature and at the discharge end of the oven, in each cycle, a group of six mandrels bearing tubing lengths at the moulding temperature is discharged into the track 21 within the pre-treating station 26 in which thermal conditions are such as to produce in the tubing lengths regions of lower temperature such that in subsequent mouldinging these regions will "balloon" less than the hotter regions and thereby give rise to regions of increased wall thickness in the moulded article produced.

In each cycle a group of mandrels 22 is advanced from the pre-treatment station 26 to the moulding station 23, which moulding station includes a group of six split moulds that close on the tubing lengths on mandrels at the moulding station for moulding of the tubing lengths into the desired configuration by the application of air pressure to the interior of such tubing lengths.

In each cycle, moreover, a group of mandrels bearing moulded articles resulting from the operations at the moulding station during the preceding cycle is moved towards the unloading station 24 while the preceding group of mandrels bearing moulded articles is advanced to the unloading station and has the articles on such mandrels stripped from the latter to enable such group of mandrels to receive further tubing lengths when such group of mandrels reaches the loading station 25.

Figure 3:
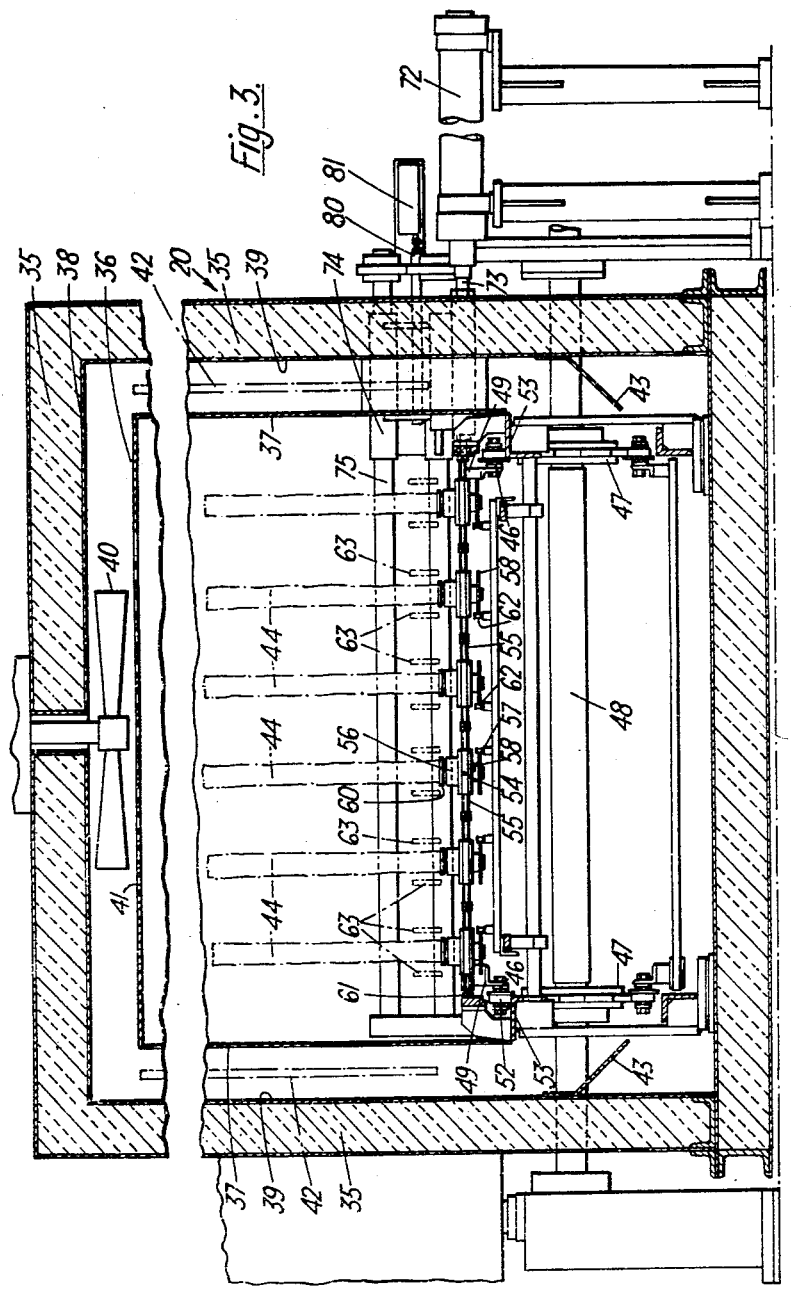
FIGURE 3 is a section, on an enlarged scale, of the oven of the apparatus of FIGURE 1, this section being taken on the line III—III of FIGURE 1.

The oven 20 comprises a generally rectangular chamber extending, as seen in FIGURE 1, along the rear of the apparatus, this chamber being of double-walled construction with the inter-wall space filled with insulating material such as compressed glass fibre, as indicated at 35 in FIGURE 3. Internally, the oven has a false ceiling 36 and false sides 37 spaced from the roof 38 and inner walls 39, respectively, of the oven, fans 40 serving to draw air within the oven upwardly through vents 41 in the false ceiling 36 and to force such air to flow outwardly and downwardly between the false sides 37 and walls 39 over electrical heating elements 42, the heated air then being directed into the lower part of the oven by baffles 43.

The heating elements 42 are controlled by temperature-sensitive devices (not shown) whereby an appropriate atmospheric temperature is maintained within the oven for heating tubing lengths such as shown at 44 to moulding temperature during their transit through the oven 20.

Within the oven 20, groups of mandrels are supported by an endless oven conveyor generally indicated at 45 (FIGURES 4, 6 and 7), this conveyor comprising a pair of endless chains 46 disposed one at each side of the oven and running on sprockets 47 on shafts 48 extending across each end of the oven. Corresponding alternate links on each chain 46 have brackets 49 secured thereto, each bracket 49 having a pair of upstanding lugs 50 supporting the corresponding ends of a pair of slats 51 which extend across the oven to be supported by the corresponding lugs 50 of the brackets 49 of the chain 46 at the other side of the oven. At intervals along its length, each chain 46 has a flanged roller 52 that runs on a guide rail 53 at the side of the oven, whereby the upper run of each chain is guided to follow a horizontal path from one end of the oven to the other.

The pairs of slats 51 serve to support groups of mandrels therebetween. The mandrels each comprise a slide 54 in the form of a block having grooves in opposite parallel side faces, the slides 54 being adapted to fit between a pair of slats 51 of the oven conveyor with the slats seated in said grooves. Each slide 54 carries a pair of adjustable spacing screws 55 that extend from its end faces parallel with the grooved side faces of the slides and serve to abut against corresponding spacing screws 55 of adjacent mandrels thereby to determine the spacing of adjacent mandrels of a group.

The slide 54 of each mandrel has a tubular boss 56 within which is rotatably fitted a tubular spigot 57 the lower end of which is fitted with a sprocket 58 and the upper end of which carries a pair of hairpin-shaped supports 59 in cruciform arrangement for supporting a tubing length 44 vertically on the mandrel. Above the boss 56 the spigot 57 has a peripheral flange 60 that serves to locate the lower end of a tubing length placed on the mandrel and fitting over the upper end of the spigot 57 above flange 60.

The space between each pair of slats 51 of the upper run of the oven conveyor 45 can thus accommodate a group of mandrels in end-to-end arrangement with the spacing screws 55 of adjacent mandrels in abutment. The oven has guides 61 at its sides that engage the outer spacing screws 55 of the end mandrels of the group and thus the mandrels of a group are positively retained in predetermined positions along the pair of slats 51 holding the group. It will be understood that in operation of the apparatus the oven conveyor 45 has its upper run fully loaded with groups of tube-bearing mandrels, one group being discharged from the oven and another entering the oven for each successive advance of the conveyor by a distance equal to the spacing between successive groups of mandrels on the conveyor 45.

Each group of tubing lengths 44 on a group of mandrels thus resides in the oven for a period that is a high multiple of the cycle time. Because of this extended residence time in the oven the tubing lengths will be assured of reaching moulding temperature throughout even when the apparatus is operated with a relatively short cycle time for high output: moreover, because the total number of mandrels and tubing lengths in the oven greatly exceeds the number in a group, the discharge of a hot group and its replacement by a cold group once per cycle does not lead to significant fluctuations in oven temperature.

To assure uniformity of heating of the tubing lengths 44, a set of six roller chains 62 on edge are stretched along the oven to be engaged by the sprockets 58 of the spigots of the mandrels. As a result, each advance of the oven conveyor produces a small increment of rotation of the spigots 57 and the tubing lengths thereon with respect to the slides 54 of the mandrels.

Near the discharge end of the oven, a series of parallel heater bars 63 extend alongside the paths followed by the lower ends of the tubing lengths 44 on the mandrels, these heater bars serving to supply extra heat to the lower ends of the tubing lengths to compensate for heating lag due to contact with the mandrel spigots and for masking of such parts of the tubing lengths, by the mandrel slides and conveyor slats, from the generally upwardly flowing hot air in the oven.

Figure 5:
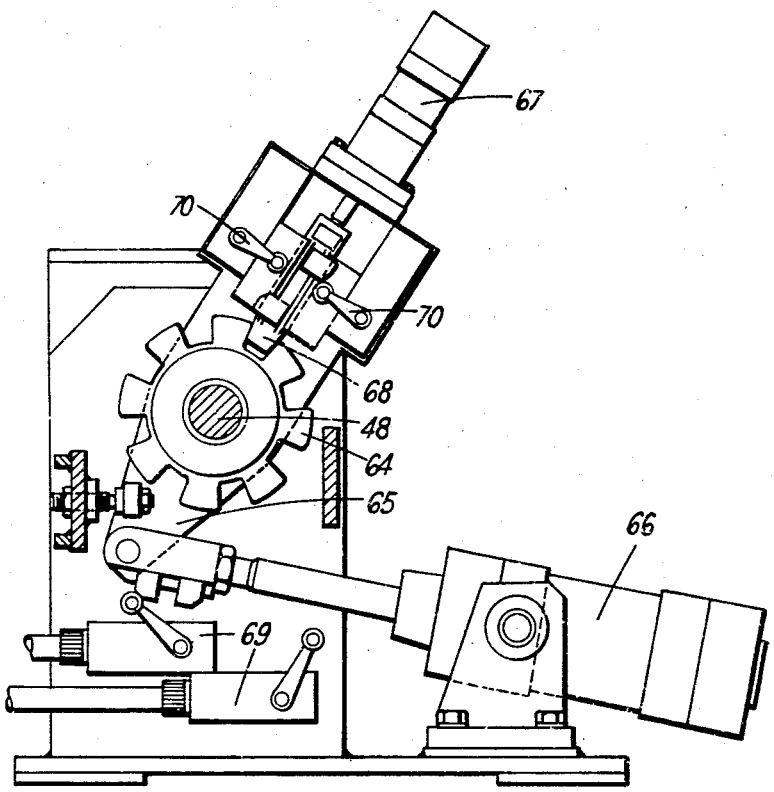
FIGURE 5 is a part-sectional elevational view, on an enlarged scale, on line V—V of FIGURE 1.

The advance of the oven conveyor 45 is effected by a ratchet device best seen in FIGURE 5. Thus the shaft 48 at the discharge end of the oven and mounting the sprockets 47 at that end of the oven extends through the rear wall of the oven and carries a ratchet wheel 64. A ratchet plate 65 is rockable on the shaft by a hydraulic piston and cylinder assembly 66, the plate 65 mounting a piston and cylinder assembly 67 that moves a dog 68 into and out of engagement with the ratchet wheel 64, the arrangement being such that the assembly 66 retracts while the dog 68 is disengaged from the wheel 64 so that the plate 65 rocks idly, the dog 68 being then engaged with wheel 64 and assembly 66 extended to rock plate 65 whilst it is locked to wheel 64 by the dog 68. Thus each extension of assembly 66 causes an incremental angular movement of shaft 48 to advance the oven conveyor 45 by one step. The movements of the assemblies 66, 67 are sensed by pairs of limit switches 69, 70 respectively that signal the positions of the assemblies to the control equipment of the apparatus to enable the control equipment to co-ordinate the respective movement of the assemblies with one another and with other devices to be described.

As noted, the oven conveyor 45 constitutes one part of the conveyor means of the apparatus as a whole, the remainder of the conveyor means being constituted by the mandrel guide track 21 and means for advancing mandrels along the track 21.

The track 21 is arranged as three sides of a rectangle with curved corners, the track being supported by pillars 71 so as to be at the same level as the upper run of the oven conveyor 45. The track 21 is constituted by a pair of spaced-apart rails that are adapted to engage the grooves in the side faces of the mandrel slides 54 so that the mandrels may slide along the track in end-to-end arrangement with the spacing screws 55 in abutment.

Figure 4:
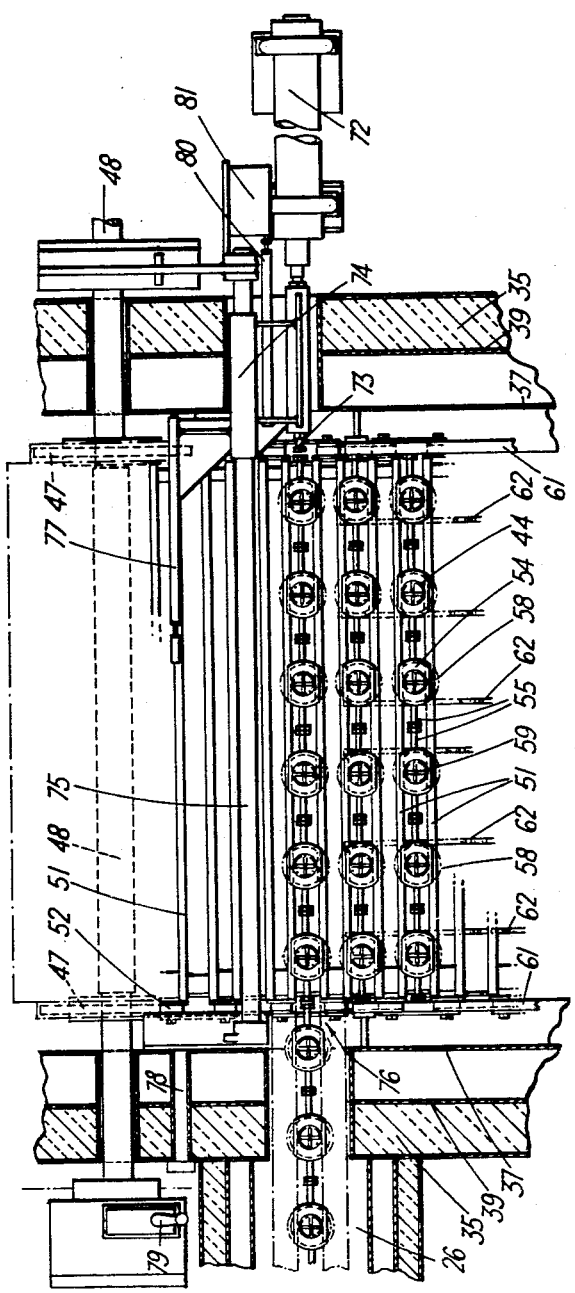
FIGURE 4 is a plan section of the oven part represented in FIGURE 3.

The mandrels are transferred from the oven conveyor 45, at the discharge end of the oven 20, to the track 21 and advanced along the latter primarily by means of a hydraulic mandrel transfer piston and cylinder assembly 72 at the rear of the oven (FIGURES 1, 3 and 4). The assembly 72 has a ram 73 that is supported by a sleeve 74 running on a guide rod 75 so that the ram 73, on extension of assembly 72, moves along a path parallel with the slats 51 of the oven conveyor and between that pair of slats 51 aligned with the oven exit 76. Accordingly, upon extension of assembly 72 its ram engages the outermost spacing screw 55 of the rearmost mandrel of the group aligned with the oven exit and pushes such group of mandrels, with heated tubing lengths 44 thereon, out from between the slats 51 of the oven conveyor and into the track 21 where this is aligned with the oven exit within the pre-treating station 26. The sleeve 74 carries a cranked arm 77 the extremity of which passes through an aperture 78 in the front wall of the oven 20, as the ram 73 approaches the end of its stroke, to engage a limit switch 79 for signalling completion of the ram stroke to the control equipment while the sleeve 74 further carries a rearwardly projecting arm 80 for engaging a limit switch 81 when the assembly 72 is fully retracted.

Figure 2:
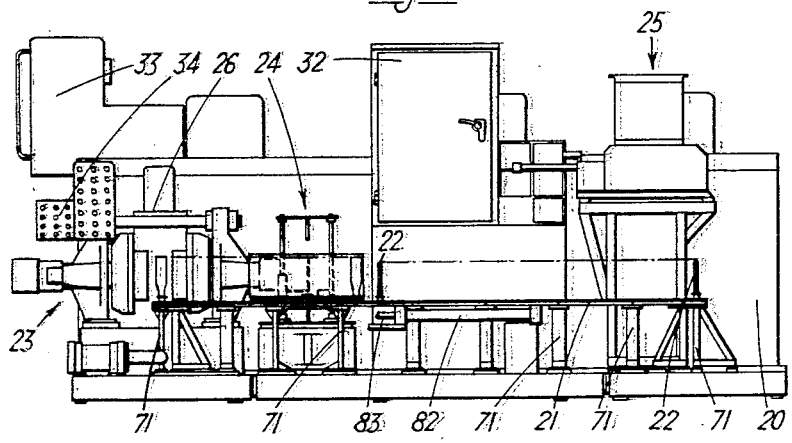
FIGURE 2 is a front elevation of the apparatus of FIGURE 1.

Movement of mandrels 22 along the track 21 is assisted by a hydraulic mandrel advance piston and cylinder assembly 82 disposed alongside the front run of the track 21, the ram 83 of such assembly reciprocating parallel with track 21, in timed relationship to the movement of ram 73, and carrying a plate 84 mounting a hydraulic piston and cylinder assembly 85 that introduces a dog 86 between a pair of adjacent mandrels in track 21 immediately prior to retraction of assembly 82 (which moves plate 84 to the right as seen in FIGURES 1 and 2) and retracts such dog at the end of retraction of assembly 82, whereby each retraction of assembly 82 effects an advance of mandrels in the track 21.

Retraction of assembly 82 is timed to occur just prior to extension of assembly 72 whereby the mandrels in the track 21 are moved therein in two sets, the six mandrels, bearing tubing lengths from the loading station 25, at the end of the track aligned with the oven entrance being shifted into place between a pair of oven conveyor slats 51 aligned with the oven entrance by the retraction of assembly 82 prior to extension of assembly 72 to transfer a group of mandrels at the discharge end of the oven to the track 21 at the oven exit 76.

Since the positioning of groups of mandrels relatively to the unloading station 24 and loading station 25, respectively, is critical for efficient performance of the functions of these stations, the track 21 is equipped with a pair of mandrel locator units 28, 29 (FIGURE 1) arranged immediately beyond stations 24, 25 respectively.

Each locator unit 28, 29, comprises a hydraulic piston and cylinder assembly that introduces a wedge-shaped dog 28a, 29a between adjacent mandrels 22 in the track, following advance of the mandrels by assemblies 72, 82 somewhat beyond the desired positions for such mandrels, to shift the mandrels back along the track into predetermined positions relatively to the associated stations 24, 25.

The ready transfer of mandrels from track 21 to the oven conveyor 45 at the oven entrance and from the oven conveyor to the track at the oven exit by the assemblies 82, 72, respectively, demands accurate alignment of the track rails with the pairs of oven conveyor slats 51 at the track ends. Such alignment is obtained by means of track locator units 30, 31 (FIGURES 1, 6 and 7) at the ends of the track, such units serving to effect the desired alignment of the track ends with the oven conveyor slats each time the oven conveyor comes to rest following an advance thereof.

Thus referring to FIGURES 6 and 7, each end of the track 21 has a terminal section 87, one rail of which is rockable in its own plane about a vertical pivot, the other rail 88 of the terminal section has a longitudinal slot 89 receiving a vertical pin 90 permitting such rail to rock about the vertical pivot aforesaid.

The rails of the terminal section 87 have longitudinal slots receiving a slide 91 movable on guide rods 92 by means of a hydraulic piston and cylinder assembly 93, the slide 91 having tapered pins 94 at its extremity which, upon advance of the slide towards the end of the terminal section 87, enter locating bores 95 in the lugs 50 of the oven conveyor 45. Any misalignment of the rails of the track terminal section 87 with the slats 51 of the oven conveyor at the oven entrance or exit, due for instance to thermal extension of the oven conveyor and/or wear of the bearings thereof, is thus eliminated by appropriate displacement of the track terminal section consequent upon entry of the pins 94 into the bores 95.

The stroke end positions of the assembly 93 are signalled to the control equipment by limit switches 96.

It has been noted that upon discharge of a group of mandrels, bearing heated tubing lengths, from the oven conveyor 45 at the oven exit 76, the so discharged mandrels enter a pre-treating station 26. The station 26 is similar in construction to the oven, being equipped with a fan 97 for circulating air within the interior of the station and over heating elements (not shown), various baffles (not shown) being arranged within the station 26 to direct hot air at those regions of the tubing lengths that are to be raised in temperature so as to "balloon" more readily during subsequent moulding, the station 26 further being equipped internally with nozzles (not shown) that direct jets of cool air at those parts of the tubing lengths that are to be lowered in temperature so as to be less readily "ballooned" in moulding and thus to result in regions of increased wall thickness in the moulded articles. The layout of the baffles and cool air nozzles within the station 26 will of course depend upon the form of the moulded articles to be produced by the apparatus.

In each cycle, a group of mandrels bearing heated tubing lengths is transferred, by the operation of the piston and cylinder assembly 72, from the pretreating station 26 to the moulding station 23. At this moulding station, this group of mandrels is located between a pair of water-cooled platens 98 which carry the parts 99 of a split multi-cavity mould that, in the illustrated embodiment, has six mold cavities 99a spaced apart by distances corresponding with the spacing of the mandrels in the track 21.

Hydraulic piston and cylinder assemblies 100 operated in timed relationship to the operation of the mandrel transfer assembly 72 move the mould platens 98 towards and away from each other so that the mould parts 99 close upon the tubing lengths 44 therebetween when the mandrels bearing such tubing lengths have come to rest following an operation of assembly 72. As the mould parts 99 close on the tubing lengths 44, the upper extremity of each tubing length is nipped between spring-loaded grippers 101 that thereby seal the upper end of the tubing length.

A group of nipples 102 situated below the track 21 at the moulding station is adapted to be moved vertically by piston and cylinder assemblies 103 (FIGURE 9) for engaging the nipples 102 with the tubular spigots 57 of the individual mandrels at the moulding station during closure of the mould parts 99. The nipples 102 are connected by flexible pipes 104 to a source of compressed air and the arrangement is such that the nipples are raised to engage spigots 57 and compressed air is supplied to the nipples as the grippers 101 seal the ends of the tubing lengths 44 just prior to closure of the mould parts 99, so that the tubing lengths 44 commence to expand at this time. When the mould parts 99 are fully closed, the expansion of the tubing lengths 44 within the mould cavities 99a is completed to achieve moulding of the desired articles. The mould parts 99 are maintained at a relatively low temperature, because of the water-cooling of the platens 98, so that the moulded articles rapidly set to a sufficiently rigid state to be self-supporting upon re-opening of the mould parts by retraction of the platens 98 which retraction is preceded by cutting-off the supply of compressed air to the nipples and lowering of the latter.

The positions of the mould platens 98 are sensed and signalled to the control equipment by limit switches as at 105; similarly the position of the nipples 102 is sensed and signalled to the control equipment by limit switches as at 106.

Referring now to FIGURES 10, 11, 12 and 13, these figures illustrate the construction of the loading station 25 which serves to load cold lengths 44 of thermoplastic tubing on to mandrels 22 for conveyance into and through the oven 20 and thence to the molding station 23 in the manner hereinabove described.

The loading station 25 comprises a hopper 107, only part of which is shown in the drawings and which contains a supply of tubing lengths 44 that lie horizontally in the hopper with their axes perpendicular to the vertical plane containing the mandrel guide track 21 at the loading station. The hopper 107 has sloping bottom walls 108 that converge to an outlet 109 which leads to a pair of downwardly sloping channels 110 that terminate above vertical channels 111. The bottom walls of the channels 110 are constituted by plates 112 that are reciprocated longitudinally of the channels by means of an eccentric 113 driven by a motor 114 and acting on the plates 112 through linkages 115. Regular feeding of tubing lengths 44 down the channels 110 and into the channels 111 from the hopper 107 is thus assured.

The channels 111 terminate above a pair of trays 116 that have parallel recesses 117 therein for the accommodation of tubing lengths. The trays 116 are mounted for reciprocation, by hydraulic piston and cylinder assemblies 133, towards and away from one another underneath the lower ends of the channels 111, whereby tubing lengths will drop from the channels 111 into the recesses 117 of each tray as this moves outwardly to the position shown in FIGURES 10 and 11.

The direction of reciprocation of the trays 116 is parallel with the mandrel guide track 21 at the loading station and parallel with the axis of a drum 118 disposed above the mandrel guide track. The drum 118 is mounted for rotation about its axis, such rotation of the drum being effected by means of a pinion 119 at one end of the drum meshing with rack 120 that has a peg 121 that runs in a cam track 122 on the underside of the support 123 for one of the trays 116. The arrangement is such that during the strike of such tray 116 the drum 118 is rotated about its axis through an angle of 90°.

The drum 118 is equipped with sleeves 124 that define diametrical passages through the drum at positions corresponding with the positions of mandrels 22 at rest in the guide track 21 below the drum. The spacing of the recesses 117 in the trays 116 also corresponds with the mandrel spacing and the arrangement is such that when the trays 116 approach one another they reach positions in which the recesses 117 in each tray are aligned with the planes of rotation of the centre lines of the respective passages defined by the sleeves 124 in the drum 118. Moreover, the arrangement of the cam track 122 is such that when the trays 116 are in such position, the drum 118 is in a position such that the passages of the sleeves 124 are horizontally disposed in alignment with the tray recesses 117. It should here be understood that FIGURES 10 and 11 illustrate the arrangement when the trays 116 are at the outer ends of their respective strokes, whilst FIGURE 12 shows the disposition of the parts when the trays have reached the inner ends of their respective strokes.

The loading station further comprises a tube transfer device constituted by a bar 125 having dependent page 126 that correspond in position with the centre lines of the tray recesses 117 when the trays 116 are in their positions of closest approach. The bar 125 is mounted on a slide 127 running on guide rods 128 and propelled therealong by a hydraulic piston and cylinder assembly 129. The arrangement is such that when the assembly 129 is extended with the trays 116 in their positions of closest approach, the bar 125 sweeps the pegs 126 along the respective recesses 117 in the trays 116 to move tubing lengths 44 in such tray recesses longitudinally into and through the sleeves 124 in the drum 118 until the rear ends of the tubing lengths are substantially flush with the corresponding ends of the sleeves 124.

A set of tubular guides 130 is disposed beneath the drum 118 at positions corresponding with the sleeves 124 in the drum.

It will accordingly be understood that, following approach of the trays 116, extension of assembly 129 to displace the tubing lengths 44 in the tray recesses 117 into the sleeves 124 of the drum 118 and subsequent retraction of assembly 129, outward movement of the trays 116 to pick up further tubing lengths from the channels 111 results in rotation of drum 118 through 90° in the direction of arrow 131 (FIGURE 12) whereby the tubing lengths in the sleeves 124 of the drum are rotated into a vertical position above the guides 130 to descend therethrough on to the mandrels 22 positioned in the guide track 21 therebeneath. An arcuate shield 132 masks the appropriate part of the drum periphery to prevent endwise movement of the tubing lengths in the sleeves 124 during the aforesaid rotation of the drum 118.

The positions of the trays is sensed and signalled to the control equipment by limit switches 134, 135 and a limit switch 136 and another limit switch (not shown) senses and signals to the control equipment the positions, at its stroke ends, of the assembly 129.

Referring now to FIGURE 14 of the drawings, this shows the construction of the unloading station 24, the function of which is to strip moulded articles from the mandrels 22 so that the mandrels may be reloaded with cold tubing lengths when they reach the loading station 25.

The unloading station 24 comprises a pedestal 137 supporting a pair of vertical guides 138 for sleeves 138a supporting a platform 139 that carries a table 140 movable forwardly and rearwardly with respect to the platform 139 upon guide rods 141.

A hydraulic piston and cylinder assembly 142 supported in vertical attitude by the pedestal 134 has its ram 143 connected to the rearwardly extending arm 144 of a bellcrank lever pivoted at 145 to the platform 139 and having an upwardly extending arm 146 terminating in a ball end in a recess in the table 140.

Springs as at 147 urge the table 140 forwardly with respect to the platform 139. However, the arrangement is such that when the piston and cylinder assembly 142 is fully retracted and the platform 139 is in the lowest position permitted by abutment of sleeves 138a with the top of the pedestal 137, the downwards thrust of the ram 143 rocks the bellcrank lever so as to retract the table 140 against the thrust of springs 147. FIGURE 14 illustrates the condition of the parts of the unloading station with the assembly 142 fully retracted.

Extension of the piston and cylinder assembly 142 move the ram 143 upwardly and effects raising of the platform 139 relative to the pedestal 137. However, since the thrust of ram 143 is transmitted to the platform 139 via the rearwardly directed arm 144 of the bellcrank lever, the initial extension of the assembly 142 is effective to displace the table 140 forwardly with respect to the platform 139 before the platform is lifted from its lowermost position. The forward movement of the table 140 is assisted by springs 147 which thus ensure that the forward movement of the table 140 is completed before raising of the platform 139 occurs during the subsequent part of the extension stroke of ram 143.

The front edge of the table 140 has arcuate recesses corresponding in position with mandrels 22 at rest in the guide track 21 at the unloading station. Above each of these recesses is a pair of jaws 148 pivoted to the table 140 about an axis parallel with the front edge thereof; such jaws are disposed, when the platform 139 is in its lowermost position, at the level of the ring-like "flash," on the lower end of a moulded article supported by a mandrel at the loading station, that is formed from the part of the original tubing length 44 that fits over the spigot 57 of a mandrel. The arrangement is thus such that when the piston and cylinder assembly 142 commences to extend, the table 140 moves forwardly to cause the jaws 148 to engage and cut into the aforesaid ring-like flask of the moulded article on each mandrel 22 at the unloading station. Subsequent raising of the table 140 by continued extension of assembly 142 is thus effective to raise the moulded articles from the mandrels 22 at the unloading station.

The table 140 has lugs 149 that slidably support horizontal rods 150 that mount, at their front ends, a stripper bar 151 and are urged rearwardly of the table 140 by springs 152. A bracket 153 on the table 140 pivotably supports the upper end of a dependent fork 154 that engages a peg 155 on one of the rods 150, the fork 154 mounting, between its ends, a roller 156 positioned to engage a cam 157 supported by a crosshead 158 linking the vertical guides 138. The arrangement is such that when the table 140, in its forward position relatively to the platform 139, approaches the limit of its upward movement resulting from extension of assembly 142, the roller 156 engages the cam 157 so that the fork 154 is swung forwardly to cause the stripper bar 151 to sweep forwardly over the jaws 148 and thereby dislodge the moulded articles from such jaws. To ensure that the moulded articles fall forwardly upon such dislodgment from the jaws 148, the stripper bar 151 carries a vertical plate 159 that moves forwardly with the stripper bar to engage the moulded articles and topple these forwardly as their lower extremities are released from the jaws 148.

Accordingly, at the unloading station 24 the moulded articles on mandrels 22 at such station are lifted upwardly off the mandrels and then displaced forwardly so as to fall to the front of the guide track 21 into a suitable receptacle (not shown).

The end positions of the horizontal and vertical movements of the table 140 are sensed and signalled to the control equipment by limit switches 160 and 161.

From the foregoing description of the apparatus and of the operation of the individual units thereof, it will be understood that the motions of the various moving parts are produced by hydraulic piston and cylinder assemblies and the limits of all motions are sensed and signalled to the control equipment by means of limit switches. The control equipment housed in the cabinets 32, 33 and controlled by push-buttons on the control panel 34 co-ordinates the operations of the various units of the apparatus by controlling the operation of electrically-operated valves (not shown) for the various hydraulic piston and cylinder assemblies in dependence upon the signals received from the limit switches. In general, the various motions occur in sequence and the control equipment responds to a limit switch signal signifying the termination of one motion by operating the appropriate valve to initiate the next motion in the sequence.

Thus the overall cycle of the apparatus proceeds with each step in the cycle initiated by completion of the preceding step.

It will however be understood that the mould parts 99 must remain in closed condition for a predetermined duration to permit cooling of the moulded articles in the mould cavities 99a and accordingly at this stage in the operating cycle a timing device, forming part of the control equipment, is set into operation to maintain the mould parts 99 in closed condition for the desired duration, such timing device producing, at the end of the desired interval, a signal to operate the appropriate valves to cause re-opening of the mould parts by retraction of the platens 98.

The timing device is set into operation by the signal from the limit switches 105 that are operated upon closure of the mould parts 99 and the timing device is adjustable so as to enable the duration of mould-closed conditions to be pre-set at a value appropriate to the articles being moulded. From the description of the moulding station it will be understood that the timing device must also control the cutting-off of the compressed air supply to the nipples 102 which, as explained, occurs shortly in advance of mould re-opening at an instant related in time to the re-opening of the mould. Accordingly, it will be understood that the timing device produces two time-spaced signals following the elapse of a chosen interval from closure of the mould, the first such signal effecting cutting-off of the compressed air supply to the nipples 102 and the second initiating re-opening of the mould.

In normal operation of the apparatus, the operating cycle repeats automatically following completion of any cycle but the push-buttons on the control panel provide for operation of individual units of the apparatus alone or in combination. Thus the functions of any unit of the apparatus can be checked by individual operation and starting up and shutting down of the apparatus is facilitated.

Thus with normal cyclic operation of the oven conveyor 45 and the mandrel-moving assemblies 72, 82, mandrels can be circulated at start-up until operating temperature conditions have been established in the oven 20 and the circulating mandrels, whereafter the loading station can be brought individually into the cycle to load mandrels with tubing lengths until loaded mandrels reach the oven exit 76 when the moulding and unloading stations can be successively brought into the cycle to establish fully automatic, complete operation of the apparatus. Similarly, shut-down can be progressively brought about by first switching the loading station out of the cycle and thereafter switching out the moulding station and the unloading station when the last-loaded mandrels have reached and passed through these stations, prior to stopping the oven conveyor and the operation of the assemblies 72, 82.

In the described apparatus a typical mould-closed duration is in the range 5 to 10 seconds with an overall cycle time of 9 to 14 seconds. The minimum duration permissible for mould-closed condition is determined by the time necessary to complete motions that proceed while the mould is closed: such motions are, for instance, those occurring at the loading station 25 to load cold tubing lengths on to mandrels at this station, motions at the unloading station to strip articles from the mandrels thereat and the adavnce of the oven conveyor 45.

As hereinabove noted, the described embodiment is arranged for the moulding of six articles simultaneously in each cycle. In adapting the apparatus to mould different numbers of articles per cycle, the changes required are substitution of appropriate mould parts 99 with the required number of mould cavities 99a and adjustment of the spacing screws 55 of the mandrel slides so as to conform the mandrel spacing in the track 21 with the corresponding spacing of the mould cavities 99a. It is also necessary to change the number and position of the jaws 143 on the table 140 of the unloading station to suit the change in number and spacing of the moulded articles to be stripped from mandrels at each operation of the unloading station, and it is also necessary to adjust the loading station so as to feed the required number of tubing lengths to the mandrels in conformity with the spacing of the mandrels at the loading station.

Adaptation of the loading station involves substitution of trays 116 by different trays having recesses 117 of appropriate number and separation to conform to the number and spacing of the mandrels to be loaded at each operation, and complementary repositioning of the dependent page 126 on the bar 125. It is also necessary to reset the sleeves 124 in the drum 118 so that the number and position of the sleeves correspond respectively with the number and spacing of the mandrels to be loaded, and it is further necessary to adjust the tubular guides 130 to conform in number and position with the sleeves 124 in the drum 118. Such adjustments of the drum 118 and guides 130 are easily effected since, as is apparent in the drawings, the sleeves 124 are accommodated in two groups in a pair of longitudinal slots in drum 118 whereby the number and spacing of the sleeves is selected merely by securing the appropriate number of sleeves at the required intervals in each said slot while the guides 130 are likewise accommodated in a slot in a support below the drum whereby the appropriate number of guides may be fitted in desired positions in said support. In connection with guides 130, it should be understood that the length of the guides is selected so that tubing lengths are effectively guided on to the mandrels therebelow with the lower ends of the guides at a level that is just above the upper ends of loaded tubing lengths on the mandrels; accordingly, when the apparatus is adjusted to use tubing lengths of changed length, complementary changes of the guides 130 may be required.

Thus, by means of relatively simple adjustments and substitution of parts the described embodiment can be set up to produce a chosen number of moulded articles at each cycle and in the case of moulding small articles, high productivities can be obtained by moulding, for instance, ten articles per cycle.

The forms of the invention here described and illustrated are presented merely as examples of how the invention may be embodied and applied. Other forms, embodiments and applications of the invention, coming within the proper scope of the appended claims, will, of course suggest themselves to those skilled in the art.

I claim:

1. Apparatus for forming hollow articles from thermoplastic material, comprising a plurality of mandrels for supporting individual discrete lengths of thermoplastic tubing, a loading station including means for loading said mandrels with said tubing lengths, an oven for heating mandrel-supported tubing lengths to moulding temperature, a moulding station including mould means adapted to receive at least one of said mandrel-supported tubing lengths at moulding temperature and means for introducing fluid under pressure into said tubing length to expand same into conformity with said mould means to form a moulded article, an unloading station including means for removing said article from said mandrel, slides supporting said mandrels, a guide track supporting said slides for movement therealong and extending from said oven to and through said moulding station, thence to and through said unloading station and thereafter to and through said loading station to said oven, a drive conveyor extending within said oven, said conveyor including transverse guides for receiving said slides for conveyance through said oven in side-by-side spaced-apart relationship, means for intermittently advancing said drive conveyor, means operative when said drive conveyor is at rest for discharging at least one of said slides from said drive conveyor into said guide track while advancing said slides in the latter to feed a corresponding number of said slides from said guide track into said drive conveyor, and means co-ordinating the operations at said stations with the movement of said slides in said guide track.

2. Apparatus according to claim 1, wherein said drive conveyor comprises an endless conveyor having an upper run extending horizontally through said oven at the level of said guide track, the latter having its ends directed transverse to the length of said conveyor upper run and disposed adjacent to the respective ends thereof, said drive conveyor comprising pairs of transverse slats adapted to receive therebetween said slides discharged from one end of said guide track to convey said mandrel slides through said oven for discharge into the other end of said guide track.

3. Apparatus according to claim 2, wherein said loading station comprises a horizontal tray having a recess to receive one of said tubing lengths to be loaded on to one of said mandrels, a sleeve adjacent to said tray, means for displacing said tubing length from said recess into said sleeve, and means for rotating said sleeve to move said tubing length therein to erect position above said mandrel.

4. Apparatus according to claim 2, wherein said loading station comprises a horizontal tray having a plurality of recesses, a drum having a plurality of sleeves proximate said tray, and means for simultaneously displacing a plurality of said tubing lengths from said recesses into said sleeves, said sleeves being diametrically disposed in said drum, whereby rotation of said drum simultaneously rotates said sleeves to erect said tubing lengths when disposed therein above a plurality of said mandrels positioned below said sleeves.

5. Apparatus according to claim 4, including a feed channel, wherein said tray is reciprocable under said feed channel through which said tubing lengths pass to said recesses upon reciprocation of said tray.

6. Apparatus according to claim 5, wherein said unloading station comprises a jaw movable to engage a moulded article on one of said mandrels, and means for moving said jaw upwardly to strip said jaw engaged article from said mandrel.

7. Apparatus according to claim 1, wherein said mould means comprises a single split multiple cavity mould for simultaneously moulding one of said groups of mandrel-supported heated tubing lengths, said conveyor means being adapted to advance said groups of mandrels in a non-circular path to and from said mould, the amount of advance of each said group corresponding to the number of said mandrels grouped therein.

8. Apparatus according to claim 1 including a pre-treating station disposed between said oven and said moulding station, said pre-treating station comprising means for increasing the oven temperature of a first portion of said tubing length for thereafter decreasing the wall thickness thereof and means for decreasing the oven temperature of a second portion of said tubing length to retain said wall thickness when said length passes to said moulding station.

References Cited in the file of this patent

UNITED STATES PATENTS

| | | |
|---|---|---|
| 2,401,564 | Hofman | June 4, 1946 |
| 2,649,659 | Kahle | Aug. 25, 1953 |
| 2,792,593 | Hardgrove | May 21, 1957 |
| 3,013,301 | Lang | Dec. 19, 1961 |
| 3,072,959 | Leeds et al. | Jan. 15, 1963 |